(12) United States Patent
Davis et al.

(10) Patent No.: US 9,996,484 B1
(45) Date of Patent: Jun. 12, 2018

(54) HARDWARE ACCELERATION FOR SOFTWARE EMULATION OF PCI EXPRESS COMPLIANT DEVICES

(71) Applicant: Amazon Technologies, Inc., Reno, NV (US)

(72) Inventors: Mark Bradley Davis, Austin, TX (US); Anthony Nicholas Liguori, Bainbridge Island, WA (US); Daniel Thomas Marquette, Austin, TX (US); Asif Kahn, Cedar Park, TX (US)

(73) Assignee: Amazon Technologies, Inc., Reno, NV (US)

( * ) Notice: Subject to any disclaimer, the term of this patent is extended or adjusted under 35 U.S.C. 154(b) by 830 days.

(21) Appl. No.: 14/489,453

(22) Filed: Sep. 17, 2014

(51) Int. Cl.
| | |
|---|---|
| *G06F 9/455* | (2018.01) |
| *G06F 13/10* | (2006.01) |
| *G06F 13/38* | (2006.01) |

(52) U.S. Cl.
CPC .......... *G06F 13/105* (2013.01); *G06F 13/385* (2013.01)

(58) Field of Classification Search
None
See application file for complete search history.

(56) References Cited

U.S. PATENT DOCUMENTS

| | | | | |
|---|---|---|---|---|
| 7,743,197 | B2 * | 6/2010 | Chavan | G06F 13/4022 709/250 |
| 7,983,888 | B2 | 7/2011 | Evoy et al. | |
| 2003/0056036 | A1 * | 3/2003 | Carlton | G06F 11/221 710/15 |
| 2007/0005913 | A1 * | 1/2007 | Muthrasanallur | G06F 13/1668 711/157 |
| 2008/0005297 | A1 | 1/2008 | Kjos et al. | |
| 2009/0006708 | A1 | 1/2009 | Lim | |
| 2009/0043921 | A1 | 2/2009 | Roy | |
| 2012/0284446 | A1 | 11/2012 | Biran et al. | |

OTHER PUBLICATIONS

"Usbredir From Spice" accessed Jun. 25, 2014, pp. 1-2.

* cited by examiner

*Primary Examiner* — Craig Dorais
(74) *Attorney, Agent, or Firm* — Robert C. Kowert; Meyertons, Hood, Kivlin, Kowert & Goetzel, P.C.

(57) ABSTRACT

A system that provides virtualized computing resources may include an enhanced PCIe endpoint device on which an emulation processor emulates PCIe compliant hardware in software. The endpoint device may include host interface circuitry that implements pointer registers and control and status registers for each of multiple transaction ring buffers instantiated in memory on the device. In response to receiving a transaction layer packet that includes a transaction, packet steering circuitry may push the transaction into one of the buffers, dependent on the transaction type, a routing identifier for an emulated device to which it is directed, its traffic class or other criteria. The transaction may be processed in software, emulating the hardware device. The host interface circuitry may generate response completion packets for configuration requests and non-posted transactions, and may return them according to PCIe ordering rules, regardless of the order in which they were processed on the endpoint device.

18 Claims, 11 Drawing Sheets

HARDWARE ACCELERATION FOR SOFTWARE EMULATION OF PCI EXPRESS COMPLIANT DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Today, a common way to implement virtualization for peripheral devices is to run a process in a virtual machine (or hypervisor) on the main server cores of the system on which other virtual machines are running on behalf of guests. The process traps all of the accesses to the virtual hardware for the peripheral devices and then emulates those devices in software. In some cases, with this approach, the software that is responsible for emulating the peripheral devices can sometimes cause jitter and variability in performance for the guests that are running on the same machine. In addition, for an infrastructure provider that implements this approach, the processing capacity of the processor cores that are running the emulation software is not available for sale or lease to customers.

Many peripheral devices are compliant to the PCI Express (Peripheral Component Interconnect Express) bus standard. PCI Express (also referred to as PCIe) is a high-speed serial computer expansion bus standard, some versions of which support hardware I/O virtualization. In general, a PCIe bus supports full-duplex communication between any two endpoints, with data encapsulated in packets.

Figure 1:
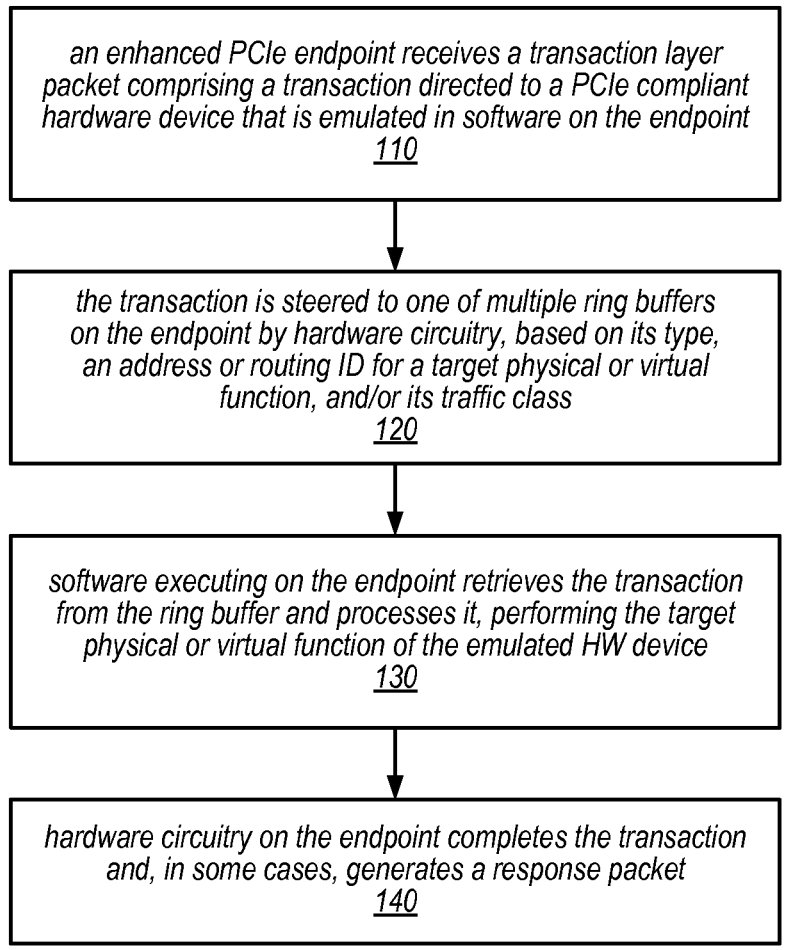
FIG. 1 is a flow diagram illustrating one embodiment of a method for using an enhanced PCIe endpoint device to emulate a PCIe compliant hardware device.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A system that provides virtualized computing resources may include enhanced PCIe endpoint devices on which local endpoint emulation processors emulate PCIe compliant hardware in software. In some embodiments, the hardware architecture of the enhanced PCIe endpoint devices and the techniques described herein may allow multi-threaded software to emulate any type of single root I/O virtualization (SR-IOV) PCIe device, with hardware acceleration, and compliant with PCIe ordering rules.

In some embodiments, the enhanced PCIe endpoint devices described herein may include host interface circuitry that implements pointer registers and control and status registers for each of multiple transaction ring buffers instantiated in memory on the device. In response to receiving a transaction layer packet that includes a transaction, packet steering circuitry on the endpoint device may push the transaction into a particular one of the buffers, dependent on the transaction type, an address or routing identifier for an emulated hardware device to which it is directed, its traffic class, and/or other transaction-related parameter values. Subsequently, the transaction may be processed in software (e.g., software executing on an emulation processor on the enhanced PCIe endpoint device), which emulates the targeted hardware device. In some embodiments, the host interface circuitry may generate response completion packets for configuration requests and non-posted transactions, and may return them according to PCIe ordering rules, regardless of the order in which they were processed on the endpoint device.

In some embodiments, the systems described herein (e.g., systems that provide virtualized computing and/or storage resources to clients) may use a processor that is not part of the main CPU complex (e.g., the CPU complex that executes virtual machines on behalf of guests) to perform the emulation of PCIe compliant hardware devices (or physical and/or virtual functions thereof). For example, an enhanced PCIe endpoint device may be a PCIe card on which is built an interface that facilitates the emulation of hardware devices using what is essentially a PCI pass-through to connect virtual machine guests directly over the PCI bus to the PCIe card, on which the emulation software is running. In some embodiments the enhanced PCIe endpoint devices described herein may be programmed to emulate multiple devices of the same type or of different types simultaneously.

The PCIe device emulation approach described herein may allow a wide-range of device controllers to be emulated in software on the device. This approach may allow service providers to create virtual devices (aka self-virtualizing devices), i.e., full virtual device controllers in software, which may eliminate any requirement for instantiating every potentially interesting device controller in the PCIe endpoint device. In some embodiments, the enhanced PCIe endpoint devices described herein may provide a hardware architecture that enables a high-performance, flexible platform for SR-IOV device emulations.

In some embodiments, the enhanced PCIe endpoint devices described herein may implement the following functions and features:

Provide an enhanced PCIe endpoint that presents multiple PCIe physical functions (PFs), and a large number of virtual functions (VFs) per PF.

Present a SR-IOV target interface to the compute host that allows for optimized software implementation of fungible devices. The enhanced PCIe endpoint devices described herein may support at least 4096 (and up to 64K) virtual functions (VFs) that are presented as fungible devices (i.e., generic devices that can dynamically take on any personality). In various embodiments, these devices may support efficient implementation of any or all of the following personality types, as well as others not listed below:

Storage (e.g., NVMe, SAS, SATA, etc.)

Networking (based on the Ethernet or InfiniBand® protocols, Virtio-net-pci, etc.)

Graphics (e.g., VGA, etc.)

Super I/O, including all of the legacy platform devices such as four UARTs, the PCKBD controller, the RTC, a firmware configuration interface, the Programmable Interval Timer (PIT), and an I/O APIC.

USB

Management function

Provide hardware response for configuration requests.

Provide ability for software to intercept both posted and non-posted transactions to allow for device emulation.

Provide ability for multiple threads to participate in device emulation, allowing software to complete transactions in-order or out-of-order, and a hardware mechanism to enforce PCIe ordering rules for completion responses.

Facilitate hypervisor/kernel bypass to allow host's guests to directly interact with the emulated devices.

Most existing PCIe endpoint cards on the market implement the actual PCIe controllers as hardware controllers on the card. The enhanced PCIe endpoint cards described herein may instead include a hardware infrastructure that enables high-speed emulation of devices, while the actual controllers are implemented as software emulations (as opposed to being implemented in dedicated hardware on the card). In other words, this approach may provide a hardware interface that facilitates the accelerated emulation of arbitrary PCI devices in order to reap the benefits of off-loading emulation onto a separate hardware card (thus freeing up main CPU capacity), while also providing the flexibility that comes along with software virtualization).

As described in more detail below, an enhanced PCIe endpoint may include a host interface module that is implemented largely (or entirely) in a hardware module (e.g., in host interface circuitry). In some embodiments, the host interface module may include multiple transaction ring buffers (e.g., circular queues) into which transactions directed to the endpoint (or to emulated hardware devices or physical and/or virtual functions thereof) are placed upon receipt and from which the transactions may be retrieved for processing on the endpoint (e.g., by a local processor, or processor core thereof, that executes emulation code for various hardware devices).

One embodiment of a method for using an enhanced PCIe endpoint device to emulate a PCIe compliant hardware device is illustrated by the flow diagram in FIG. 1. As illustrated at 110, in this example, the method may include an enhanced PCIe endpoint (e.g., a host interface module or host interface circuitry of the endpoint) receiving a transaction layer packet comprising a transaction directed to a PCIe compliant hardware device that is emulated in software on the endpoint. Note that in some embodiments, the emulated hardware device may be one of multiple hardware devices emulated in software on the endpoint. As illustrated in this example, the method may include steering the transaction to one of multiple ring buffers on the endpoint (e.g., circular buffers that are instantiated in memory on the endpoint) by hardware circuitry, based on the transaction type, an address or routing ID for a target physical or virtual function, the traffic class for the transaction, and/or other transaction-related parameter values, as in 120.

As illustrated in FIG. 1, the method may include software executing on the endpoint retrieving the transaction from the ring buffer and processing it, which may include performing the target physical or virtual function of the emulated hardware device, as in 130. The method may also include hardware circuitry on the endpoint completing the transaction and, in some cases, generating a completion response packet, as in 140.

Figure 2:
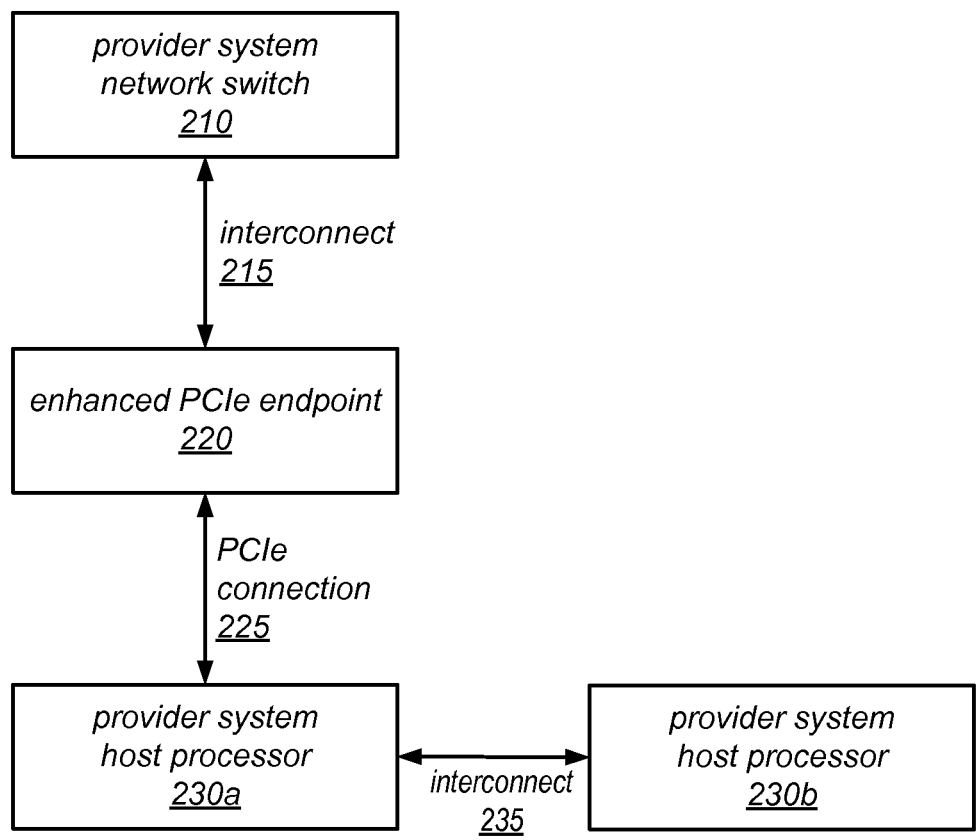
FIG. 2 is a block diagram illustrating the relationships between an enhanced PCIe endpoint in a service provider system, the host processors of the service provider system, and a service provider network switch, according to at least one embodiment.

FIG. 2 is a block diagram illustrating the relationships between an enhanced PCIe endpoint in a service provider system, the host processors of the service provider system, and a service provider network switch, according to one embodiment. In this example, a provider system network switch 210 is coupled to an enhanced PCIe endpoint 220 (e.g., a PCIe card in a data center of a service provider that provides virtualized computing and storage services) over an interconnect 215 (e.g., an Ethernet connection). The enhanced PCIe endpoint 220 is coupled to provider system host processor 230a (e.g., one of multiple main server processors or motherboard processors in the service provider system) over a PCIe connection 225. In this example, provider system host processor 230a is coupled to provider system host processor 230b over interconnect 235 (e.g., a point-to-point processor interconnect) and may route communication traffic to provider system host processor 230b. In other embodiments, the enhanced PCIe endpoint 220 may have the ability to support PCIe interfaces to both provider system host processors to minimize latency and jitter effects of relaying the traffic directed to provider system host processor 230b through provider system host processor 230a. In some embodiments, the provider system network switch 210 may serve to connect the enhanced PCIe endpoint 220 (or a network interface thereof) to other networks (e.g., to the public Internet or to an intermediate network) and/or to other networked devices in the provider's data center (e.g., to the next level data center routers that, eventually, connect together all of the other servers, or racks thereof, in the data center).

In some embodiments, the PCIe connection 225 between enhanced PCIe endpoint 220 and provider system host processor 230a may be a third generation PCIe interface (e.g., a PCIe Gen3 x4, x8, or 16 interface, depending upon bandwidth, cost, and/or power considerations) and the PCIe controller for enhanced PCIe endpoint 220 may be a dual-mode (root complex and endpoint) controller. In some embodiments, enhanced PCIe endpoint 220 (and/or its host interface) may be configured to be software extensible such that a wide range of different devices and physical functions thereof may be realized in software.

In existing single root I/O virtualization (SR-IOV) PCIe devices, there is typically a dedicated hardware controller (e.g., one implemented in an integrated circuit device) for each different IO controller, and the SR-IOV allows multiple guests to share the IO controller. By contrast, the enhanced PCIe endpoint cards described herein may include an embedded processor core on the PCI card that emulates multiple different IO controllers in software running on that processor core.

PCIe Conceptual Model

In some embodiments, the functional organization of the enhanced PCIe endpoint cards described herein may be similar to that of other SR-IOV PCIe devices. For example, they may implement multiple different physical functions, and with each physical function there may be multiple different virtual functions (e.g., there may be three virtual functions for a given physical function).

In some embodiments, an enhanced PCIe endpoint card, such as those described herein, may be implemented according to the following conceptual model:

The endpoint may present itself as an SR-IOV Multi-PF capable endpoint.

The endpoint may perform address translation (ATC/ATS) the between PCIe addresses and local memory addresses of the endpoint.

Each emulated device may present itself as a single physical function, and as a software-defined number of virtual functions In general, a DMA engine may be instantiated for each device class for which emulation is supported in order to increase isolation between emulated device classes The endpoint may instantiate twice the number of DMA engines than the number of device families that are expected, in order to optimize for incoming/outgoing transactions In some embodiments, the enhanced PCIe endpoint cards described herein may support the PCI SR-IOV functions but the actual function of the piece of silicon may vary. For example, one day it might be programmed to implement a VGA adapter, on another day it may be reprogrammed to implement a USB device, and on yet another day, it may be reprogrammed for Ethernet. In some embodiments, a wide range of such devices may all be emulated at once on a single card. In some such embodiments, it may appear as if the card includes a large number of different types of controllers that are built into the card at the same time. Note that in some embodiments, there may be a fixed maximum number of physical functions that can be emulated on the enhanced PCIe endpoint card at the same time (e.g., 256). Each of the functions (e.g., a USB function, a VGA function, an Ethernet function, etc.) may be called by software, and an SR-IOV may operate on top of each of those functions. In some embodiments, a PCI switch or PCI bridge that is implemented within this card (e.g., one implemented either in hardware or software) may be used to expand the number of available functions beyond 256. Note that, in this example, each of the SR-IOV virtual functions may still need to be the same type as a particular physical function. Note also that the same hierarchy for the virtual functions of a particular physical function defined for all SR-IOV devices may be implemented in the enhanced PCIe endpoint cards described herein.

SR-IOV Support

In embodiments of the enhanced PCIe endpoints that provide SR-IOV support, the following functions and features may be supported:

Each virtual function may share a number of common configuration space fields with the physical function; i.e., where the fields are applicable to all virtual functions and controlled through a single physical function.

Each function, physical function, and virtual function may be assigned a unique Routing ID. The Routing ID (RID) for each virtual function may be determined using the Routing ID of its associated physical function and fields in that physical function's SR-IOV Capability.

Each physical function may be assigned zero or more virtual functions. The number of virtual functions per physical function is not required to be identical for all physical functions within the device.

Each physical function may represent a different device type.

Using the Alternative Routing Identifier (ARI) capability, a device may support up to 256 physical functions, and may be sparse throughout the 256 Function Number space.

SR-IOV Devices may consume more than one Bus Number. A virtual function may be associated with any Bus Number within the device's Bus Number range, which includes the captured Bus Number plus any additional Bus Numbers that are configured by software.

The use of multiple Bus Numbers may enable a device to support a very large number of virtual functions, e.g., up to the size of the Routing ID space minus the bits used to identify intervening busses.

PCIe Transaction Processing

An enhanced PCIe endpoint card may present itself as a native PCIe endpoint that is presenting a configuration header type 0. The enhanced PCIe endpoint card may receive and process transactions of different types, as described below.

PCIe Request Types

Host interface transaction processing of incoming transactions received by the enhanced PCIe endpoint card may be divided into three categories:

Configuration requests, non-posted read/write (type 0 and type 1)
  Non-posted request types
  Memory read, memory read lock, IO read, IO write
  Posted request types
  Memory write, message In some embodiments, for non-posted requests, a requestor may send a packet to the enhanced PCIe endpoint card for which a completer should generate a response in the form of a completion response packet. Note that even I/O and configuration writes may be non-posted, e.g., in order to confirm that the write data has in fact made it to the destination without error. For posted requests, the targeted devices may not return a completion transaction layer packet (TLP) to the requestor. In some embodiments, configuration commands (e.g., configuration cycles) may be processed completely in hardware, with no software intervention. Other types of transactions (or commands/cycles) may be pushed into transaction ring buffers that are being managed in hardware and from which they may be retrieved (e.g., pulled out of a circular queue) for processing.

Quality of Service (QoS)/Traffic Class (TC) support

PCIe supports QoS policies and agreements by setting a 3-bit field within each packet called the Traffic Class (TC). A higher numbered TC is expected to give a higher priority to the packet. In some embodiments, multiple buffers, aka virtual channels (VCs) may be allocated for each TC so that packets can flow through each VC without being backed up behind packets with TCs that indicate a lower priority.

Transaction Ordering

Within a VC, packets may normally flow through the VC in the same order in which they arrived, with some exceptions. However, it may be understood by software that there is no ordering relationship between different TCs. The PCIe specification describes a transaction ordering model that must be maintained (e.g., defining when reads pass reads, writes pass reads, writes pass writes, etc., for different types of transactions). In embodiments in which an enhanced PCIe endpoint supports multithreaded emulation, the enhanced PCIe endpoint may include a hardware mechanism to maintain the transaction ordering semantics, so that regardless of the order in which multiple threads of the emulation process transactions, PCIe compliant transaction ordering semantics are maintained.

In one example, different tiers of multiple cores or multiple threads may all pull transactions off the same queue (e.g., off of the same transaction ring buffer). The queue may include transactions specifying various read, write, and configuration commands, and the different cores (or threads thereof) may all perform work on those transactions simultaneously. In some embodiments, any completion response packets generated for transactions that are processed simultaneously or out of order may be manipulated by the host interface circuitry to enforce compliance with the ordering rules. Note that in some embodiments, the transaction ordering requirements may be enforced separately within the context of each physical function (e.g., the ordering may be independent from one physical function to the next). As described herein, the enhanced PCIe endpoint may include a set of transaction ring buffers (queues) for the different types of transactions, and may include separate transaction ring buffers for the different virtual channels/traffic classes for each of those transaction types. In some embodiments, circuitry within the enhanced PCIe endpoint may be configured to keep up with the order in which incoming transactions are received. For example, the circuitry may include one or more timers that timestamp the transactions when they are received so that the order in which they are received is known. Subsequently, some additional hardware circuitry (e.g., logic circuitry) may be configured to implement the PCIe ordering rules in order to enforce them. The implementation of the PCIe transaction ordering rules in the enhanced PCIe endpoint may contribute to enhanced performance because they may allow transactions to go around other transactions that were received earlier but that are stalled. In addition, the implementation of the PCIe transaction ordering rules in the enhanced PCIe endpoint may allow the system to avoid deadlocks.

As described in more detail below, any arbitrary number of hardware-managed ring buffers may be instantiated in memory on an enhanced PCIe endpoint, and a hardware steering mechanism may include a software-definable mapping of various transaction-related parameter values (e.g., tuples of addresses, routing identifiers and transaction classes, or other combinations of parameter values) to specific transaction ring buffers. For example, in some embodiments, software may be configured to create a mapping table to map each of multiple combinations of transaction-related parameter values to a specific transaction ring buffer. In such embodiments, for each incoming transaction layer packet, the hardware steering mechanism may steer the transaction to a specific ring buffer, which may then add the transaction into its circular queue.

Figure 3A:
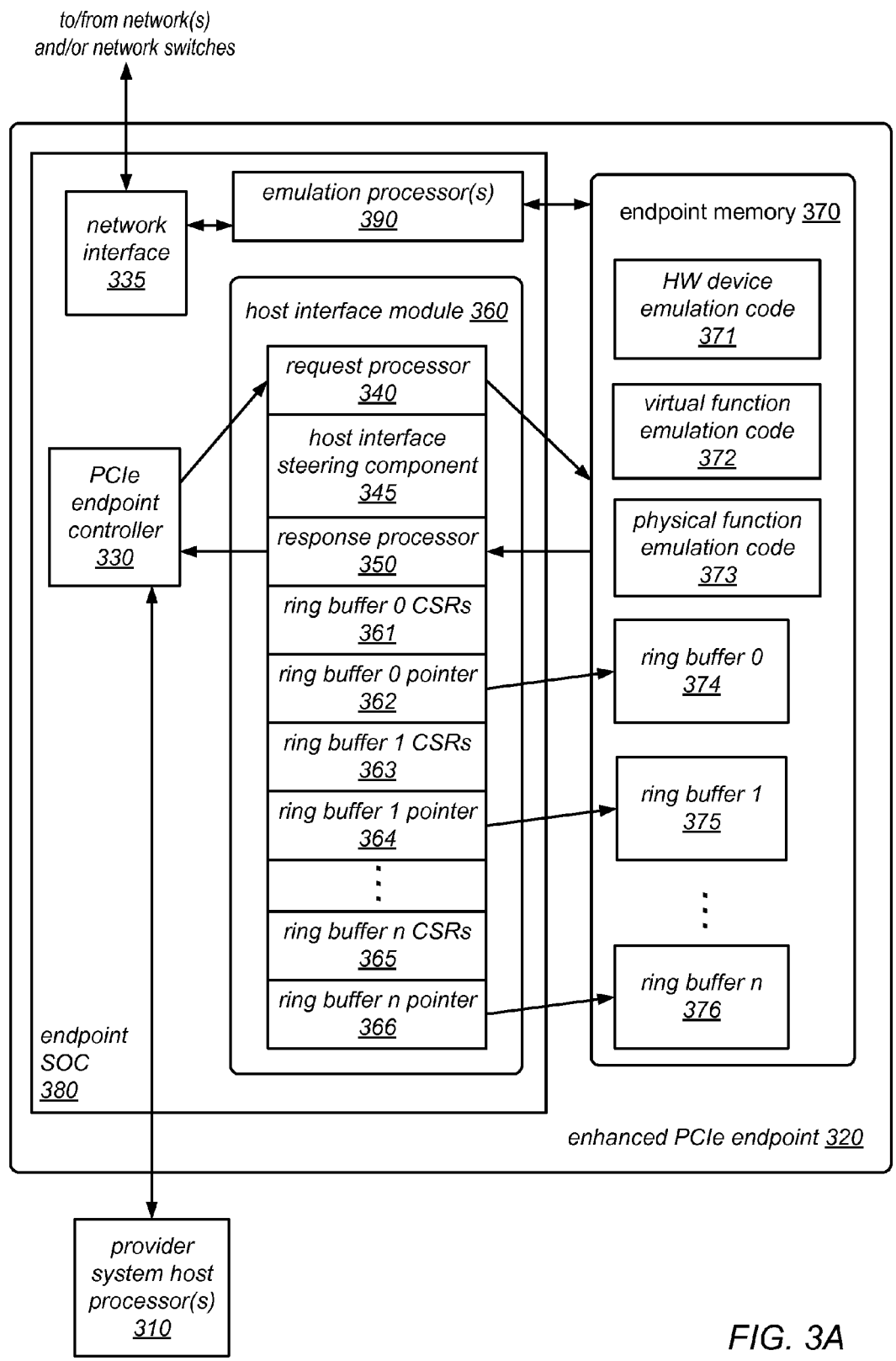
FIGS. 3A, 3B, and 3C are block diagrams, each illustrating an enhanced PCIe endpoint device, according to different embodiments.

One embodiment of an enhanced PCIe endpoint (e.g., a PCIe endpoint device on which the hardware is configured to support accelerated multi-device emulation) is illustrated by the block diagram in FIG. 3A. In this example, enhanced PCIe endpoint 320 communicates with one or more provider system host processors 310 over a PCIe compliant interface. Enhanced PCIe endpoint 320 includes a PCIe endpoint controller 330, host interface module 360, which is implemented as a hardware module (e.g., host interface circuitry) and which includes a request processor 340, a host interface steering component 345, and a response processor 350. In this example, transaction layer packets (TLPs) are exchanged between PCIe endpoint controller 330 and request processor 340, and between PCIe endpoint controller 330 and response processor 350. In some embodiments, after the incoming TLPs are processed by request processor 340, bus read or write transactions that were included in the TLPs (and any associated data or transaction parameters) may be passed from request processor 340 to particular ones of the ring buffers 374-376 in endpoint memory 370, after which responses to those transactions (if any) may be returned to response processor 350. As illustrated in this example, enhanced PCIe endpoint 320 may also include a network interface 335, through which enhanced PCIe endpoint 320 and its components (e.g., the components that make up endpoint SOC 380) communicate with other networks (e.g., the public Internet or an intermediate network) and/or with other networked devices in a provider's data center (e.g., through various network switches). Note that while FIG. 3A illustrates an embodiment in which network traffic received by network interface 335 is routed to emulation processor 390, in other embodiments, this network traffic may be routed directly to the host interface module 360 or to other components of endpoint SOC 380.

In the example illustrated in FIG. 3A, host interface module 360 also includes, for each of multiple transaction ring buffers, a control and status register (CSR) and a pointer register. These are illustrated in FIG. 3A as ring buffer CSRs 361, 363, and 365, and as ring buffer pointers 362, 364, and 366. In this example, enhanced PCIe endpoint 320 also includes one or more endpoint emulation processor(s) 390 (e.g., one or more single core or multi-core processors, some of which may be configured to execute multithreaded applications). As illustrated in this example, in some embodiments, PCIe endpoint controller 330, host interface module 360, emulation processor(s) 390, and network interface 335 may be implemented as components of a single system-on-chip (SOC) device (shown as endpoint SOC 380) on enhanced PCIe endpoint 320.

In this example, enhanced PCIe endpoint 320 includes endpoint memory 370 (which may, in some embodiments, be implemented as DRAM). In this example, enhanced PCIe endpoint 320 has instantiated within memory 370 multiple transaction ring buffers. For example, ring buffers 0-n are shown as elements 374-376 in FIG. 3A. In other embodiments, such as the embodiment illustrated in FIG. 3B, these transaction ring buffers may be instantiated in memory on the endpoint SOC (e.g., in SRAM) rather than in endpoint memory 370. In this example, endpoint memory 370 is also configured to store emulation code for one or more PCIe compliant hardware devices (and/or for the physical and/or virtual functions thereof). This is illustrated in FIG. 3A as HW device emulation code 371, virtual function emulation code 372, and physical function emulation code 373. As illustrated in FIG. 3C and described in more detail below, in some embodiments, enhanced PCIe endpoint 320 may include a physical or virtual PCI switch, which may allow the endpoint to provide a large number of emulated devices and functions within multiple sets of such emulated devices and functions.

Figure 3B:
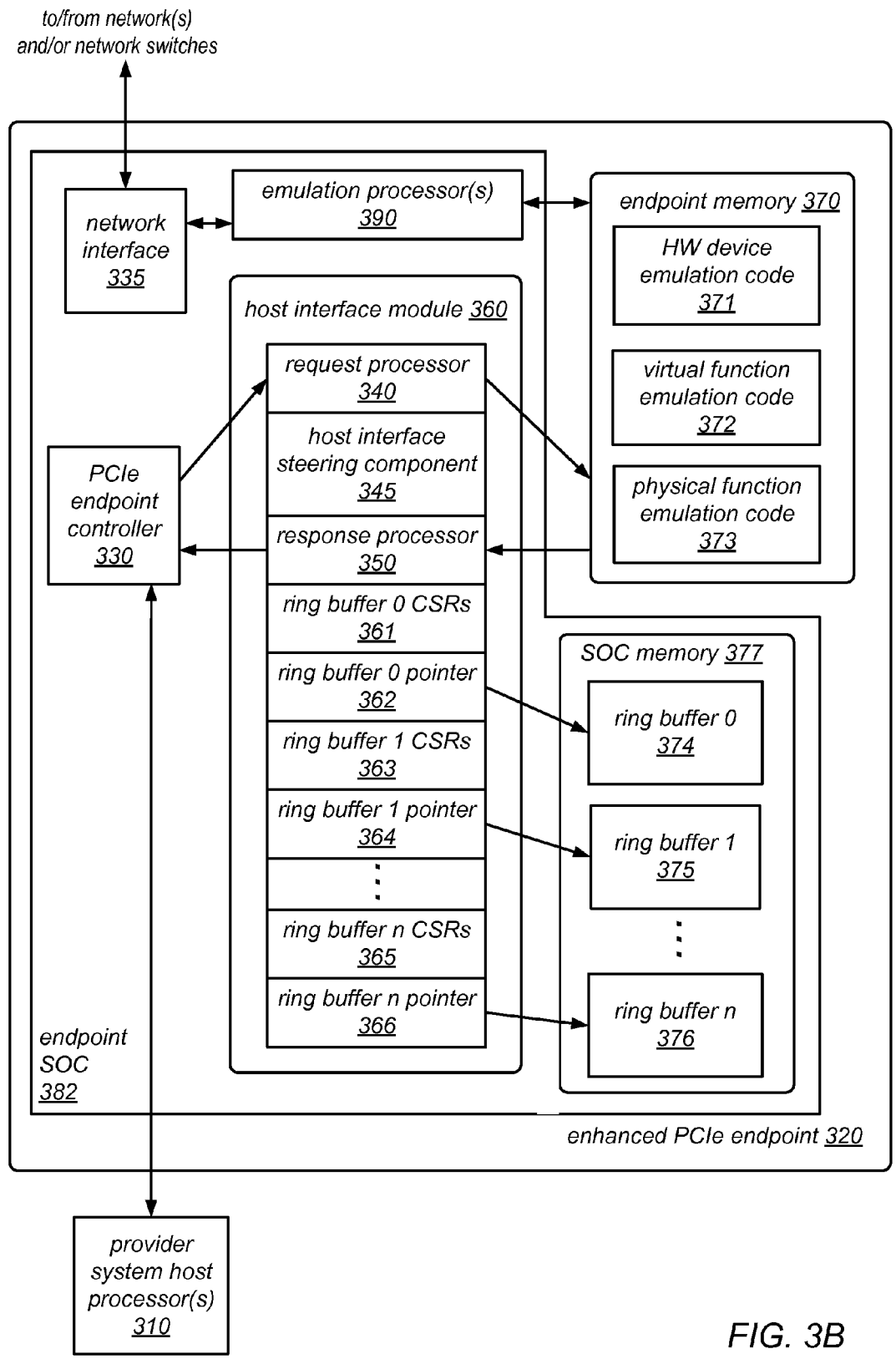
Figure 3C:
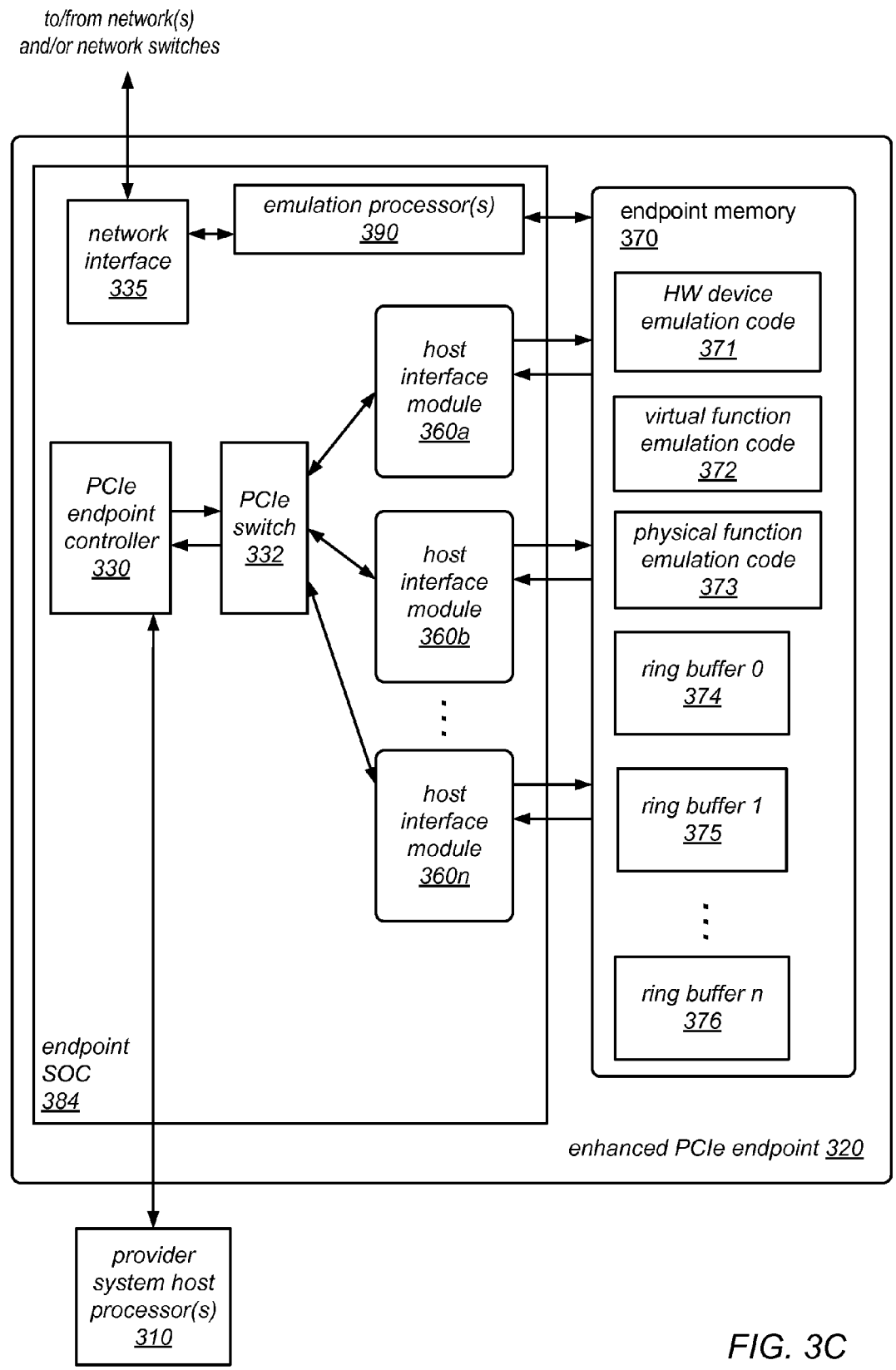

A second embodiment of an enhanced PCIe endpoint 320 (e.g., a PCIe endpoint device on which the hardware is configured to support accelerated multi-device emulation) is illustrated by the block diagram in FIG. 3B. In this example, the endpoint SOC device (shown as endpoint SOC 382) includes an SOC memory 377 (which may be implemented in SRAM, in some embodiments), and the transaction ring buffers 374-376 are implemented with SOC memory 377, rather than in endpoint memory 370.

A third embodiment of an enhanced PCIe endpoint 320 (e.g., a PCIe endpoint device on which the hardware is configured to support accelerated multi-device emulation) is illustrated by the block diagram in FIG. 3C. In this example, enhanced PCIe endpoint 320 includes a physical or virtual PCI switch (shown as PCIe switch 332) and multiple host interface modules 360 (shown as host interface modules 360*a*, 360*b*, and 360*n*), each of which may include components similar to those illustrated in host interface module 360 in FIG. 3A or in FIG. 3B and may implement functionality similar to that of host interface module 360 in FIG. 3A or in FIG. 3B. In some embodiments, each of the host interface modules 360 may include hardware circuitry (e.g., control and status registers and/or pointer register) for managing a respective collection of transaction ring buffers (e.g., ring buffers that store transactions directed to different emulated hardware devices or functions thereof). In some such embodiments, endpoint memory 370 may store emulation code for all of the hardware devices and virtual/physical functions thereof that are supported by all of the host interface modules 360. In other embodiments, the emulation code for different hardware devices or functions may be distributed among multiple separate memories or among multiple partitions of endpoint memory 370 (not shown). Similarly, in some embodiments, endpoint memory 370 may store all of the transaction ring buffers that are managed by all of the host interface modules 360. However, in other embodiments, the transaction ring buffers may be distributed among multiple separate memories or among multiple partitions of endpoint memory 370 (not shown). In some embodiments, PCIe switch 332 may be configured to select a particular one of the host interface modules 360 to which incoming TLPs are routed, dependent, at least in part, on the emulated hardware device or virtual/physical function thereof to which the transaction is directed. As illustrated in this example, enhanced PCIe endpoint 320 may also include a network interface 335, through which enhanced PCIe endpoint 320 and its components (e.g., the components that make up endpoint SOC 384) communicate with other networks (e.g., the public Internet or an intermediate network) and/or with other networked devices in a provider's data center (e.g., through various network switches). Note that while FIG. 3C illustrates an embodiment in which network traffic received by network interface 335 is routed to emulation processor 390, in other embodiments, this network traffic may be routed to the host interface modules 360 through PCIe switch 332, may be routed directly to particular ones of the host interface modules 360, or may be routed to other components of endpoint SOC 384. Note also that while FIGS. 3A, 3B, and 3C illustrate a variety of architectures for the implementation of an enhanced PCIe endpoint device and an endpoint SOC thereof, these are merely examples of the many different ways that an enhanced PCIe endpoint device and endpoint SOC may be architected, in different embodiments.

Host Interface Transaction Ring Buffer Processing

In some embodiments, the use of the transaction ring buffers and the hardware packet steering mechanism described herein may allow enhanced PCIe endpoints to handle all the different physical functions and virtual functions that are targeted by incoming transactions and to divide and queue the transactions up in different ones of the transaction ring buffers in different ways dependent, at least in part, on the transaction types and/or the traffic classes of the transactions.

As previously noted, the host interface module of the enhanced PCIe endpoints described herein may have the ability to define a number of transaction ring buffers. In one embodiment, the host interface module may include the following function and features:

A steering mechanism may be provided that allows for software to define a mapping from some combination of [address, RID, TC] to a specific transaction ring buffer.

Ring buffers may be managed with head and tail pointers.

Each entry of the ring buffer may contain core TLP data, which may include transaction information and transaction processing information, which may include any or all of the following:

Transaction information:

Header information:
Transaction type
Target address
Routing ID (RID)
Requester ID
Transfer size (if any), byte enables
Attributes
Traffic class
Data
Transaction processing information:
Timestamp data
Transaction valid bit
Transaction completion doorbell In different embodiments, the packet steering mechanism may consider a variety of criteria (e.g., any transaction-related parameter values or combination of transaction-related parameter values) when determining the particular transaction ring buffers to which individual TLPs should be steered. For example, in some embodiments, ingress memory mapped IO (MMIO) packets (e.g., packets accessing PCIe device base address registers, or BAR space) may be translated and steered to particular transaction ring buffers by the steering mechanism. In some embodiments, the translation and steering mechanism may be configured by software that is executed by a processor on the enhanced PCIe endpoint device (e.g., by the emulation processor). In some embodiments, each of the MMIO packets may first go through a translation based on the address in the packet to target a particular resource on the enhanced PCIe endpoint, such as:

Physical addresses on the enhanced PCIe endpoint, including DRAM and I/O space
CPU packet queues (e.g., transaction ring buffers) on the enhanced PCIe endpoint
A data mover component (e.g., a DMA controller)

In some embodiments, targeting physical addresses on the enhanced PCIe endpoint may allow for:
Directly mapping DRAM on the enhanced PCIe endpoint to MMIO space, which may enable features such as firmware upload.
Directly mapping IO peripherals of the enhanced PCIe endpoint (e.g., Ethernet, or a serial bus interface, such as SATA) to MMIO space, which may enable direct host control of IO peripherals of the enhanced PCIe endpoint.

In some embodiments, targeting particular transaction ring buffers may allow for queuing up packets that need to be processed by a processor on the enhanced PCIe endpoint device (e.g., by the emulation processor). Architecturally, the enhanced PCIe endpoint may support an arbitrary number of ring buffers (queues), but in practice, it may be common to have at least one per emulation processor core. As noted above, steering logic may map packets to particular ring buffers (queues) based on the packet address. The steering logic may send groups of addresses to the same processor core. This mechanism may be used, for example, to send all packets targeting the same virtual function(s) to the same processor core, or to send certain addresses from all virtual function(s) (e.g., doorbells) to the same processor core. In some embodiments, the steering addressing may be set up as address match/mask pairs. In such embodiments, there is a match if:

(match_address & match_mask)==(packet_address & match_mask)

In some embodiments, the address match can optionally be extended to be the tuple [address, traffic class], e.g., in order to factor in quality of service when performing packet steering. As noted above, reads and writes that are destined to the same processor core may be placed in a single transaction ring buffer (queue) to maintain overall ordering. In some embodiments, if a packet does not match an address in the steering logic, the packet may be mapped to a particular ring buffer (queue) using a default function. In some such embodiments, the default function may apply one of the following three approaches:

Hash—A hash function may be set up to map addresses to transaction ring buffers (queues). The hashes may be based on the upper address bits so that packets for the same virtual function(s) map to the same ring buffer (queue).
Round-robin—Packets may be assigned to ring buffers (queues) in a round robin fashion.
Default—All packets may be routed to a single default queue.

In some embodiments of the enhanced PCIe endpoint cards described herein, both read transactions and write transactions may be pushed into the same transaction ring buffer so that software sees the global ordering of the received transactions (per TC). As described in more detail herein, the enhanced PCIe endpoint cards may implement or support two transaction completion mechanisms, as follows:

A software synchronous model in which software is notified of a transaction, performs any desired processing, and writes a transaction doorbell indicating completion of the transaction.
A notification model for posted and configuration transactions in which software gets notified of the transaction.

In various embodiments, the enhanced PCIe endpoint cards described herein may include, for each ring buffer:
control and status registers (CSRs) for head, tail pointers
a CSR bit indicating whether an interrupt should be issued when a transaction is posted. The interrupt may be generated via an interrupt controller (to allow programmable steering to set of CPUs).
a CSR bit indicating whether Configuration Read transactions should be pushed into this ring buffer.
a CSR bit indicating whether Configuration Write transactions should be pushed into this ring buffer.
a CSR bit indicating whether posted transactions should be pushed into this ring buffer as a Notification.
a CSR bit indicating whether posted transactions should be pushed into this ring buffer as a Software Synchronous Transaction.

In some embodiments, although much of the functionality of the endpoint is implemented in hardware, the enhanced PCIe endpoint cards described herein may be configured using software (e.g., by one or more configuration modules executing on the endpoint). For example, in some embodiments, emulation code (such as HW device emulation code 371, virtual function emulation code 372, and/or physical function emulation code 373 illustrated in FIG. 3A, 3B, or 3C) may be written into the memory on an enhanced PCIe endpoint card (such as endpoint memory 370 on enhanced PCIe endpoint 320) by software executing on the endpoint itself or on a host server to which it is connected in order to initialize the enhanced PCIe endpoint for subsequent emulation of various hardware devices and virtual or physical functions thereof, e.g., by the execution of this code by a processor on the enhanced PCIe endpoint (such as emulation processor 390 within the endpoint SOC). Note that, in some embodiments, after initially writing emulation code into the endpoint memory, the endpoint may be subsequently reconfigured to support the emulation of more, fewer, or different functions by writing additional code into the endpoint memory, deleting code from the endpoint memory, or overwriting the code in the endpoint memory.

In another example, software may be used to initialize (and/or subsequently reconfigure) the functionality of the hardware on the enhanced PCIe endpoint. For example, software executing on the endpoint itself or on a host server to which it is connected may be configured to instantiate multiple transaction ring buffers in memory on the endpoint (e.g., in memory within the endpoint SOC or in a separate endpoint memory), and may also be configured to write initial values into the pointer registers and the control and status registers for those ring buffers in order to configure and manage them.

Figure 4:
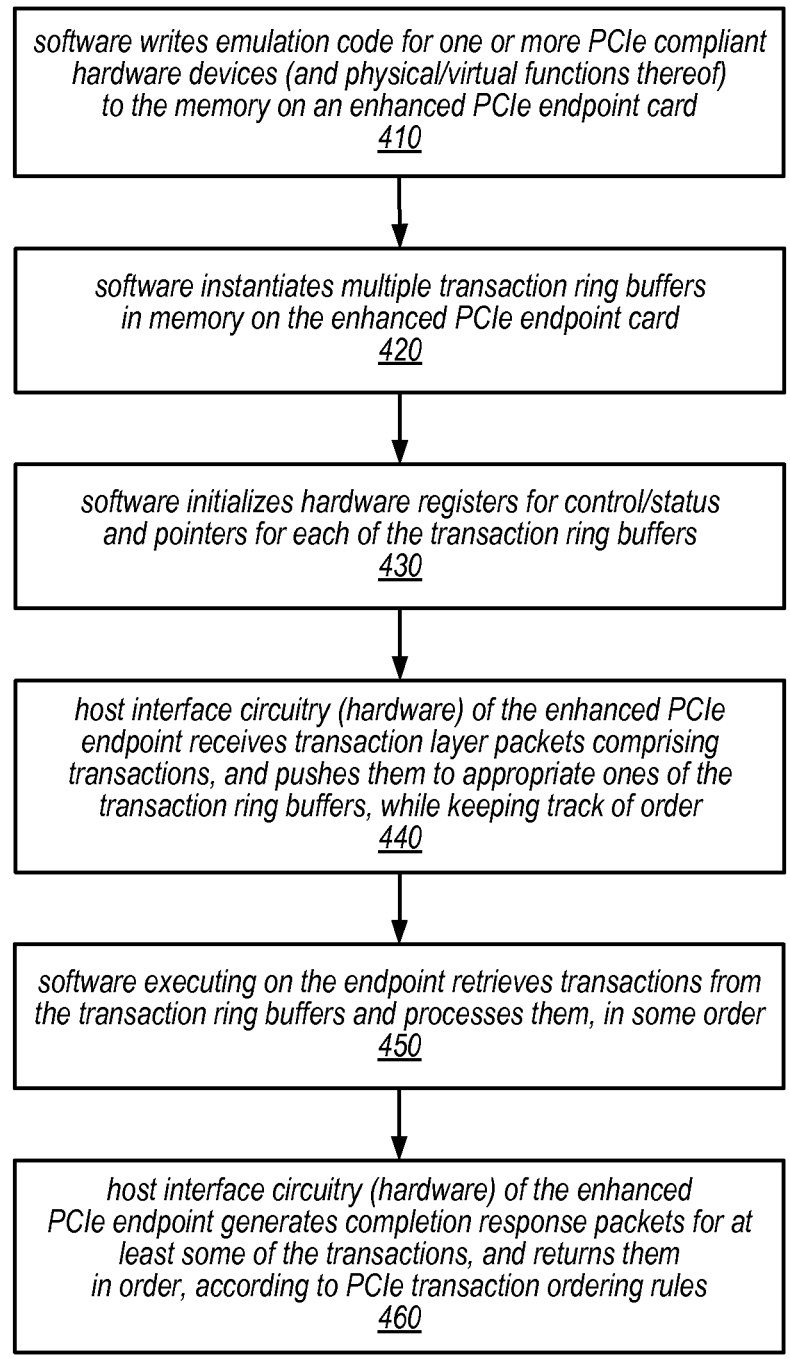
FIG. 4 is a flow diagram illustrating one embodiment of a method for configuring and using an enhanced PCIe endpoint card to accelerate multi-device emulation.

One embodiment of a method for configuring and using an enhanced PCIe endpoint card to accelerate multi-device emulation is illustrated by the flow diagram in FIG. 4. As illustrated at 410, in this example, the method may include software writing emulation code for one or more PCIe compliant hardware devices (and physical/virtual functions thereof) to the memory on an enhanced PCIe endpoint card. The method may also include software instantiating multiple transaction ring buffers in memory on the enhanced PCIe endpoint card, as in 420, and initializing hardware registers (CSRs and pointer registers) for each of the transaction ring buffers, as in 430. In other words, in this example, software may be used to configure and manage the transaction ring buffers of an enhanced PCIe endpoint card.

As illustrated in this example, method may include the host interface circuitry (e.g., a host interface hardware module) of the enhanced PCIe endpoint receiving transaction layer packets comprising transactions, and pushing the transactions (and/or other information included in the transaction layer packets) to appropriate ones of the transaction ring buffers, while keeping track of order, as in 440. For example, a steering mechanism within the host interface circuitry may map transaction-related parameter values to respective ones of the transaction ring buffers using any of a variety of criteria, including, but not limited to, those described herein. In some embodiments, the host interface circuitry may be configured to make use of timestamps included in (or associated with) the transaction layer packets to keep track of the order in which the transaction layer packets were received. The method may also include software executing on the endpoint retrieving transactions from the transaction ring buffers to which they were pushed and processing them, in some order, as in 450. For example, in various embodiments, the transactions retrieved from the transaction ring buffers may or may not be processed in the order in which they were received. As illustrated in FIG. 4, the method may also include the host interface circuitry of the enhanced PCIe endpoint generating completion response packets for at least some of the transactions, and returning them (e.g., to the transaction requester) in an order that is consistent with PCIe transaction ordering rules, as in 460. Note that, in some embodiments in which the enhanced PCIe endpoint includes multiple emulation processors (or processor cores), multiple ones of the processors (or processor cores) may be retrieving (and then processing) transactions from the same transaction ring buffer or from different transaction ring buffers at the same time (e.g., in parallel or in an overlapping manner).

As noted above, in some embodiments of the enhanced PCIe endpoint cards described herein, both read transactions and write transactions may be pushed into the same transaction ring buffer so that software sees the global ordering of the received transactions. As noted above, the transaction ring buffers may be implemented in hardware. For example, they may be instantiated in physical memory on the enhanced PCIe endpoint card, such as in a DRAM that serves as the operating memory for an emulation processor core on the endpoint card. Note that the number of transaction ring buffers that are (or that can be) instantiated on an enhanced PCIe endpoint card may be somewhat arbitrary, as there may not be a fixed relationship between transaction ring buffers and physical functions or virtual functions, and there may not be any fixed constraints on the number of transaction ring buffers.

In addition to serving as buffers for all the transactions that are received, the transaction ring buffers may also serve as a mechanism for maintaining the read/write ordering of the incoming transactions. As described herein, a hardware packet steering mechanism may have the ability to separate out incoming transactions by their traffic classes so that the lower priority transactions cannot block higher priority transactions. In some embodiments, there may be multiple different ring buffers for storing transactions in (respective) different traffic classes, and they may be separated out and steered to the different ring buffers according to a software-definable mapping. In other words, when the software is designed, the programmer may determine the mapping that is needed between some combination of routing IDs, addresses, and traffic classes and the transaction ring buffers, and may determine the number of different transaction ring buffers to instantiate in the memory on the enhanced PCIe endpoint card, depending on the type of device(s) being emulated or other factors. In one example, the number of transaction ring buffers may be equal to the number of processor cores on the endpoint card (e.g., the number of cores in the emulation processor on the endpoint card), such as 4, 8, or 16. As previously noted, each transaction ring buffer has its own control and status register (CSR), in some embodiments.

Configuration Transaction Processing

In some embodiments, only the root complex (e.g., a host server processor) may be permitted to originate configuration requests, and these requests may only move downstream. These requests may be routed based on the target device's ID (e.g., its BDF, which comprises: its Bus number in the topology, its Device number on the bus, and the Function number within the device).

In some embodiments, the enhanced PCIe endpoint card may present itself as a type 0 extended configuration space. This configuration space may include 4096 bytes per function. In some embodiments, the host interface of the enhanced PCIe endpoint card may provide the following transaction processing functions and features for configuration transactions:

The endpoint card may provide a mechanism to map a 4K "proxy" configuration workspace per BDF.
    For non-posted configuration read transactions:
        The endpoint card may build and return a completion packet by reading the data from the corresponding proxy configuration workspace. Software may have pre-populated this proxy configuration workspace with the desired data.
        Optionally (as determined by a CSR bit), the endpoint card may push a Configuration Read notification record to the corresponding host interface processing ring buffer.
    For non-posted configuration write transactions:
        The endpoint card may write the configuration data to the corresponding proxy configuration workspace.

The endpoint card may build and return a completion packet indicating the successful configuration write. Optionally (as determined by CSR bit), the endpoint card may push a Configuration Write notification record to the corresponding host interface processing ring buffer.

Host Software Synchronous Transactions

In some embodiments, the enhanced PCIe endpoint cards described herein may support software synchronous transactions, which require completion responses. In such embodiments, any incoming transaction that has been pushed into a transaction ring buffer as a software synchronous transaction may need to be marked as completed by software writing to the corresponding event doorbell for that transaction. Generally, software may either poll or be notified that there is a transaction to process. Software may then perform any emulation processing required to process the transaction, and may use one of two techniques to complete the transaction, after which point the completion response packets (return messages) may be generated by hardware on the enhanced PCIe endpoint card. The two completion techniques may be described as follows:

1. The software may write the address of the completion response packet into that transaction entry doorbell. In one example, there are multiple cores (or even a single core) processing multiple transactions retrieved off of a single queue, and three transactions (commands) have come into the transaction ring buffer that they are working on. If two of the three (e.g., the bottom two) have been processed (e.g., emulated), one way to indicate that the transactions are ready to be completed may be to update the tail pointer for the transaction ring buffer by two to tell the hardware that it can now complete two of the three transactions.

2. The software may update the ring buffer tail pointer to indicate that the oldest transaction is to be completed. In embodiments that apply this approach, doorbells may be marked individually in each transaction (command), such that the transactions may be processed out of order (from a software perspective). The hardware may be configured to detect that the transactions were processed out of order (e.g., based on timestamps and or other information) and to manipulate the return of the completion response packets for those transactions to enforce PCIe transaction ordering rules. The hardware may also be configured to update the tail pointer for the transaction ring buffer.

In some embodiments, the host interface hardware module (e.g., host interface circuitry) of an enhanced PCIe endpoint card may be configured to complete transactions as follows:

If the doorbell is written for the transaction at the tail pointer or if the tail pointer is updated by software, the completion response for that transaction may be sent to the host and the tail pointer may be updated.

If the doorbell is written for a transaction that is not at the tail pointer, hardware may enforce the PCIe ordering rules to determine when to send the completion response for that transaction, and may mark that transaction with a Software Completed/Pending Completion Message.

In some embodiments, having support for two different ways of handling synchronous transactions may provide more flexibility for the software to perform transactions out of order. For example, multiple transactions may be completed just by manipulating the tail pointer to indicate the number of transactions that have been completed in software, or the transactions may be marked as complete individually, even if they are not pointed to by the tail pointer. In some embodiments, the hardware may maintain an association with the tail pointer, as well as the order of the completion responses to be sent back to the requester to maintain PCIe ordering. The selection of the technique that software uses in completing transactions may be up to the programmer who writes an application or an emulator driver, and one approach may potentially be better for one driver and the other way may be better for other drivers. In general, the mechanisms described herein may provide the emulation processor of an enhanced PCIe endpoint the flexibility to process transactions in any order, while relying on circuitry in the host interface module to maintain PCIe ordering rules when subsequently returning any required (or optional) completion response packets.

Figure 5:
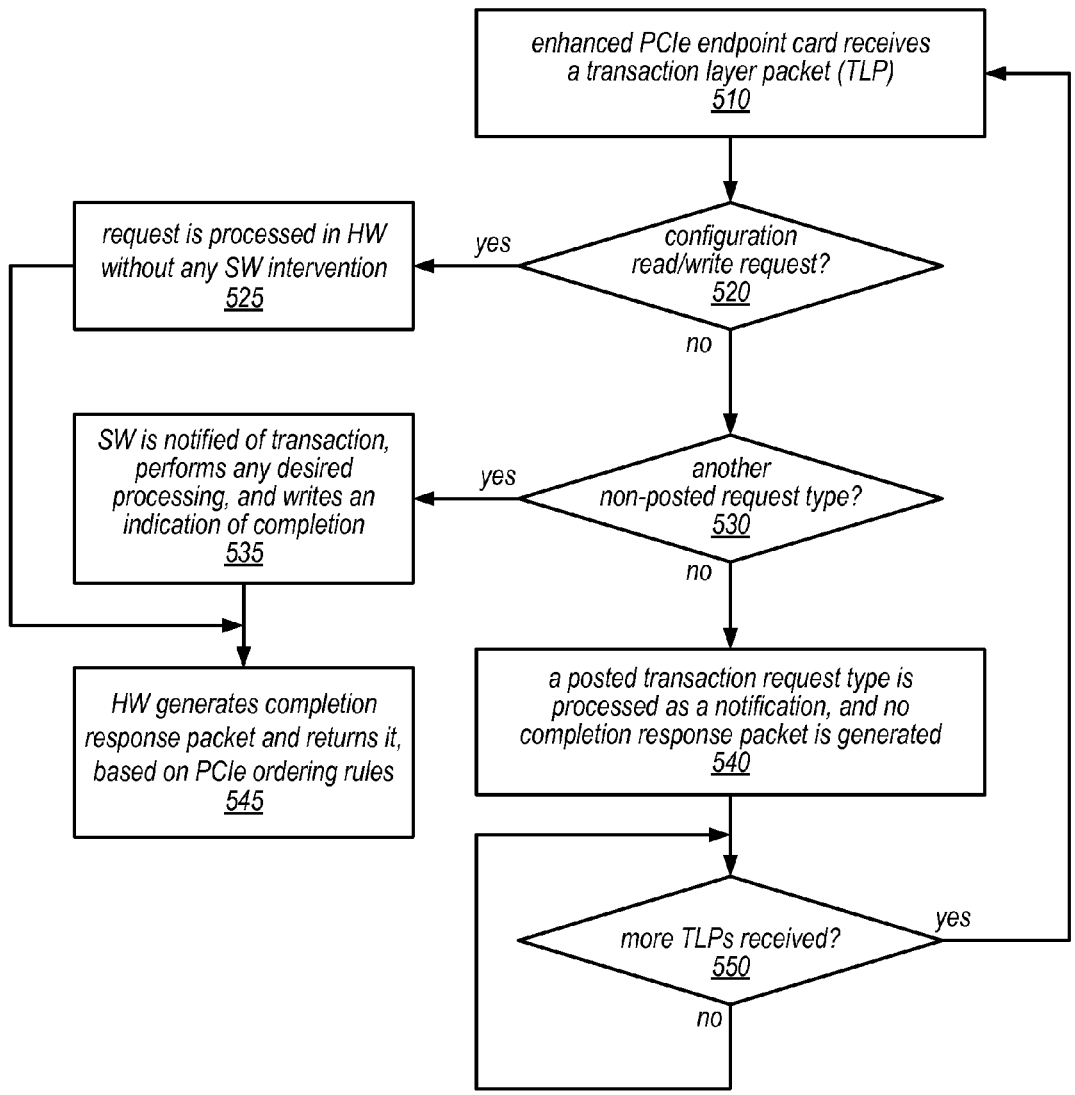
FIG. 5 is a flow diagram illustrating one embodiment of a method for processing and completing various types of transactions that are received by an enhanced PCIe endpoint card.

One embodiment of a method for processing and completing various types of transactions that are received by an enhanced PCIe endpoint card and directed to an emulated PCIe compliant hardware device is illustrated by the flow diagram in FIG. 5. As illustrated at 510, in this example, the method may include an enhanced PCIe endpoint card receiving a transaction layer packet. If the packet includes a configuration read/write request (shown as the positive exit from 520), the method may include processing the request in hardware without any software intervention, as in 525.

If the packet includes another non-posted request type (e.g., a memory read request, a memory read lock request, a I/O read, or an I/O write), shown as the positive exit from 530, the method may include notifying the software of the transaction, in response to which the software may perform any desired processing, and write an indication of the completion of the transaction, as in 535. As described herein, this may include, e.g., writing the address of the completion response packet into a doorbell for the corresponding entry in the transaction ring buffer or updating the ring buffer tail pointer to indicate that the oldest transaction is to be completed, although any of a variety of other methods for indicating the completion of the transaction may be employed, in different embodiments.

In either of these cases, the method may also include hardware generating a completion response packet and returning it to the requester (e.g., according to the PCIe transaction ordering rules), as in 545. For example, if the doorbell was written for the transaction at the tail pointer or if the tail pointer was updated by software, the completion response for the transaction may be sent to the host and the tail pointer may be updated. On the other hand, if the doorbell was written for a transaction that is not the transaction at the tail pointer, the hardware may apply the PCIe ordering rules to determine when to send the completion response for that transaction.

As illustrated in this example, if the packet does not include a configuration request or transaction of another non-posted request type (shown as the negative exit from 530), the method may include processing a posted transaction request type as a notification, without generating a completion response packet, as in 540. If and when more transaction layer packets are received, they may also be handled in the manner illustrated in 510-545 of FIG. 5. This is illustrated in FIG. 5 by the feedback from the positive exit of 550 to 510.

The techniques described herein for using an enhanced PCIe endpoint to emulate PCIe compliant hardware devices may provide an accelerated and more flexible emulation approach when compared to existing virtualization approaches. In some embodiments, the hardware architecture described herein may enable a high-performance, flexible platform for SR-IOV device emulations, allowing PCIe compliant devices to be emulated in system software. For example, these techniques may be used to provide the following features and functionality:

- Multi-threaded out of order synchronous software completion, while maintaining PCIe transaction ordering rules
- Hardware completion of configuration reads/writes for software emulation
- Data structures/processing for hardware facilitation of software emulation
- Methods for supporting emulation for multiple devices, physical functions, and virtual functions, as well as multiple traffic classes
- Support for both a software notification model and a software emulation model As previously noted, in some embodiments, the enhanced PCIe endpoints described herein may be configurable (e.g., programmable) and reconfigurable (e.g., reprogrammable) using software (e.g., one or mode configuration modules that run on the enhanced PCIe endpoints. In some such embodiments, after receiving and processing requests directed to the PCIe compliant hardware devices that the endpoint is initially configured to emulate, if a request to change the functionality of the endpoint is received, this software may reconfigure the enhanced PCIe endpoint card to emulate more, fewer, or different PCIe compliant hardware devices and physical/virtual functions thereof, after which the enhanced PCIe endpoint card may receive multiple transaction layer packets directed to hardware devices and physical/virtual functions that are emulated on the reconfigured endpoint and may process them, as appropriate. For example, in some embodiments, the software may be configured to reprogram the enhanced PCIe endpoint card in response to a request from a subscriber for a change in a virtualized computing system that is provided for their use, or in response to a request for resource instances for a virtualized computing system for the use of a different service subscriber. In various embodiments, in addition (or instead of) using software to change the number or type of PCIe compliant hardware devices and physical/virtual functions thereof that can be emulated by the endpoint card (e.g., by loading emulation code for more, fewer, or different hardware devices and physical/virtual functions into the memory on the endpoint card), software may be used to reconfigure the hardware of the enhanced PCIe endpoint card, such as by instantiating more transaction ring buffers or deallocating one or more transaction ring buffers, or by writing to various CSRs and/or pointer registers for one or more of the ring buffers.

Figure 6:
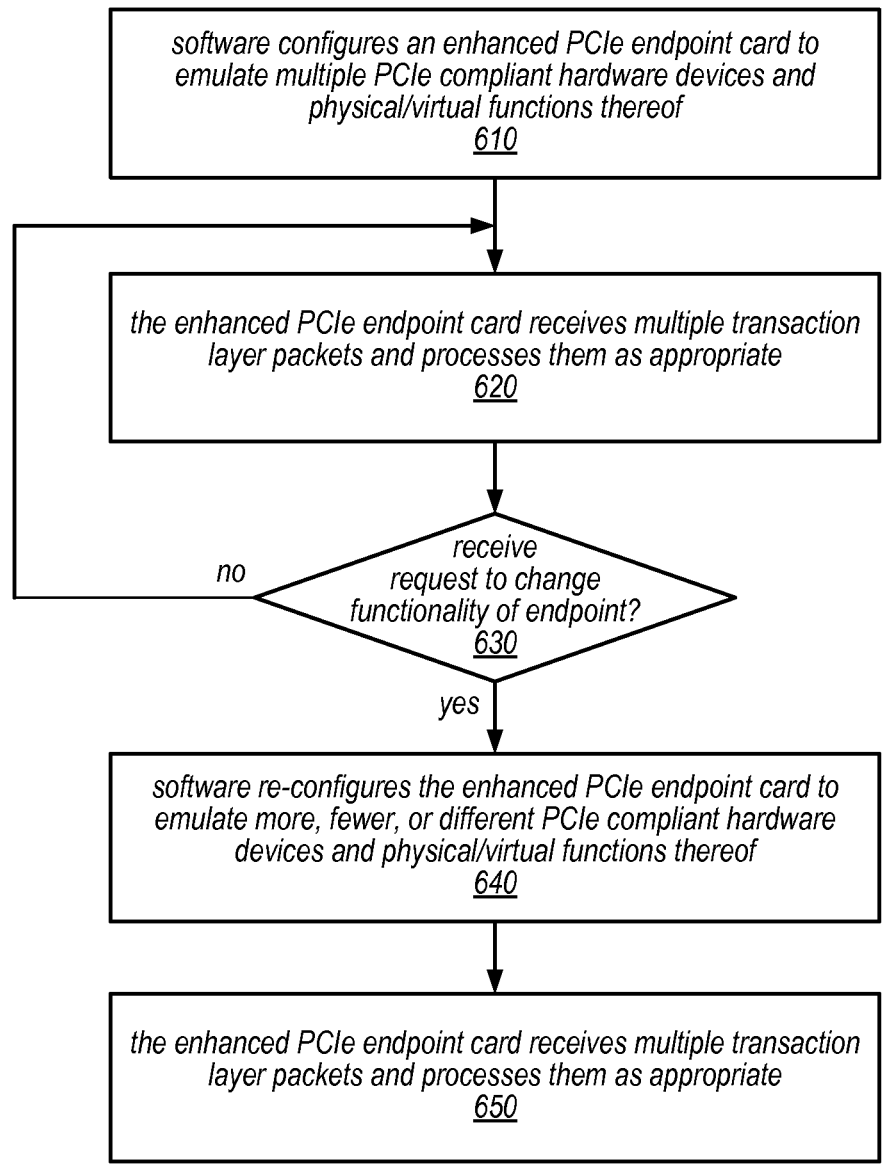
FIG. 6 is a flow diagram illustrating one embodiment of a method for configuring and reconfiguring an enhanced PCIe endpoint card for use in accelerating multi-device emulation.

One embodiment of a method for configuring and reconfiguring an enhanced PCIe endpoint card for use in accelerating multi-device emulation is illustrated by the flow diagram in FIG. 6. As illustrated at 610, in this example, the method may include software configuring an enhanced PCIe endpoint card to emulate multiple PCIe compliant hardware devices and physical/virtual functions thereof (e.g., simultaneously). For example, the software may be configured to configure the enhanced PCIe endpoint card in this manner in response to a request for resource instances of a virtualized computing system (e.g., for a given service subscriber) that includes at least some of these types of devices. As described herein, configuring the enhanced PCIe endpoint card may include one or more of: instantiating transaction ring buffers, writing to CSRs and/or pointer registers for the ring buffers to initialize their contents, and/or loading emulation code for one or more hardware devices and physical/virtual functions thereof into memory on the enhanced PCIe endpoint card. As illustrated in FIG. 6, once the enhanced PCIe endpoint card has been configured, the method may include the enhanced PCIe endpoint card receiving multiple transaction layer packets and processing them, as appropriate, as in 620.

In the example illustrated in FIG. 6, the enhanced PCIe endpoint may continue to receive and process multiple transaction layer packets that are directed to emulated hardware devices (and functions thereof) until and unless it receives a request to change the functionality of the endpoint. This is illustrated in FIG. 6 by the feedback from the negative exit of 630 to 620. If a request to change the functionality of the endpoint is received, shown as the positive exit of 630, the method may include software reconfiguring the enhanced PCIe endpoint card to emulate more, fewer, or different PCIe compliant hardware devices and physical/virtual functions thereof (as in 640), after which the enhanced PCIe endpoint card may receive multiple transaction layer packets directed to hardware devices and physical/virtual functions that are emulated on the reconfigured endpoint and may process them, as appropriate, as in 650. For example, in some embodiments, the software may be configured to reconfigure the enhanced PCIe endpoint card in response to a request from a subscriber for a change in a virtualized computing system that is provided for their use, or in response to a request for resource instances for a virtualized computing system for the use of a different service subscriber. In various embodiments, reconfiguring the enhanced PCIe endpoint card may include instantiating more transaction ring buffers or deallocating one or more transaction ring buffers, writing to various CSRs and/or pointer registers for one or more of the ring buffers, and/or loading emulation code for one or more hardware devices (e.g., for more, fewer, or different devices and physical/virtual functions) into the memory on the endpoint card, which may include deleting or overwriting the previously loaded emulation code.

As previously noted, in some embodiments, a PCI switch may be integrated on the enhanced PCIe endpoint card to allow the endpoint card to be able to support more physical functions. The PCI switch may be a physical PCI switch (e.g., one implemented by circuitry on the endpoint card), or a virtual PCI switch (e.g., a switch emulated by software executing on the endpoint card), in different embodiments. In either case, it may appear to the rest of the system (e.g., to software executing in the system) as a PCI switch.

In embodiments in which a PCI switch is integrated on the enhanced PCIe endpoint card, the PCI switch may support the PCI hot-plug feature, allowing physical and/or virtual functions to be easily and dynamically introduced and/or removed. For example, in some embodiments, it may be desirable to be able to dynamically reconfigure the system, e.g., to add more virtual block devices, to reduce the number of virtual block devices, to increase the number of virtual network adapters, etc. In some embodiments that include an integrated PCI switch, when an emulated hardware device is brought up on the endpoint card, the host may see this as a hot-plug event, and may be configured to recognize and interact with that emulated hardware device in the same manner as it would if an equivalent hardware device were dynamically introduced into the system. In contrast, in systems that rely solely on SR-IOV as a way of virtualizing devices, there is not a flexible or robust mechanism for dynamically adding and/or removing virtual functions.

Note that while many examples included herein describe apparatus and techniques for accelerating the emulation of hardware devices that comply with the PCIe bus standard, in other embodiments, these techniques may be employed in other endpoint devices to emulate hardware devices that comply with another bus expansion interface standard (e.g., one that includes a multilayer transport protocol).

Figure 7:
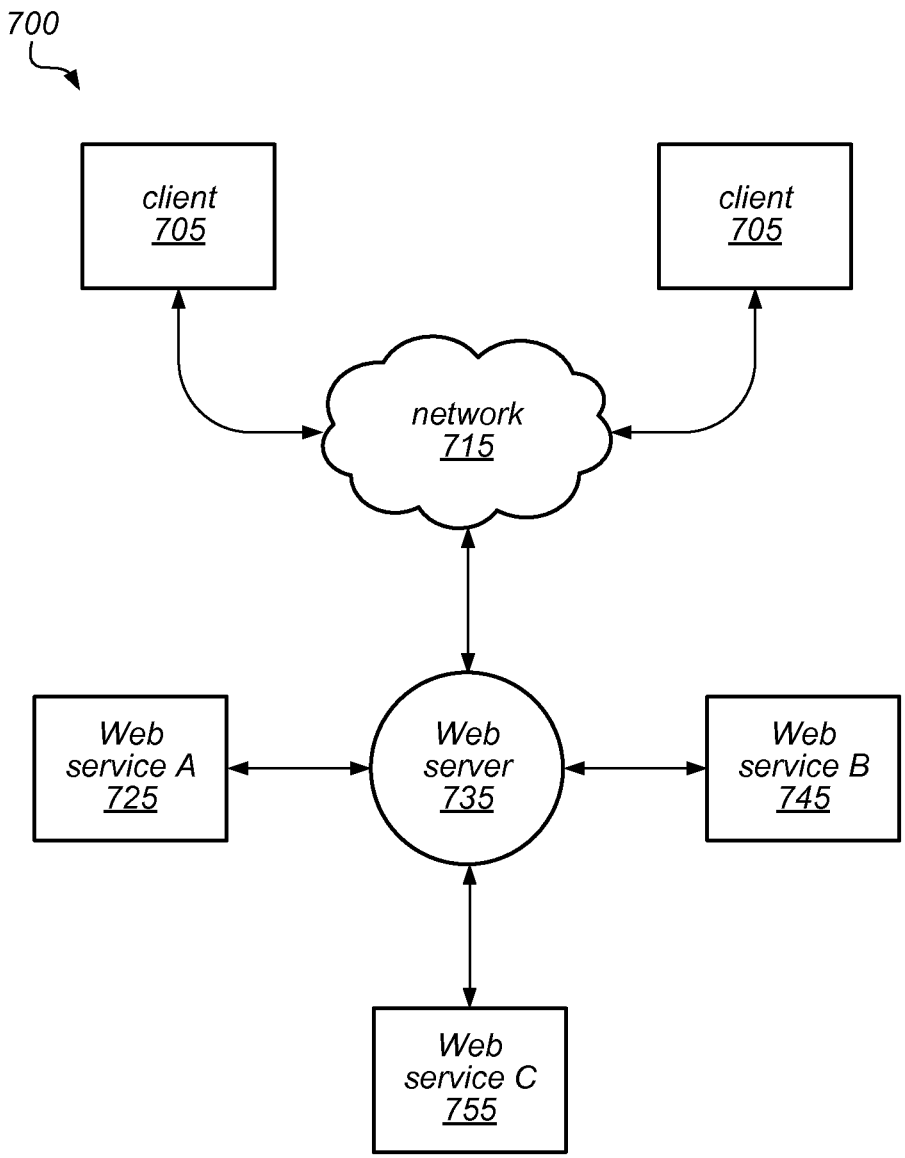
FIG. 7 is a block diagram illustrating one embodiment of a system that provides various Web-based services to clients.

Various techniques described herein for using an enhanced PCIe endpoint to accelerate the emulation of PCIe compliant hardware devices may be employed in local or remote computing systems, including systems that provide services to users (e.g., subscribers) over the Internet or over other public or private networks, such as virtual private networks and connections to services in a virtual private cloud (VPC) environment. FIG. 7 illustrates a block diagram of a system that provides various Web-based services to clients, according to one embodiment. In this example, system 700 includes one or more clients 705. In this example, the clients 705 may be configured to interact with a Web server 735 via a communication network 715.

As illustrated in this example, the Web server 735 may be configured to process requests from clients 705 for various services, such as Web service A (725), Web service B (745), and Web service C (755), and to return results to the clients 705. Each of the web services may provide clients with one or more of: computational resources, database services, data storage services (e.g., maintaining data in one or more tables on behalf of a client), or any other types of services or shared resources.

Figure 8:
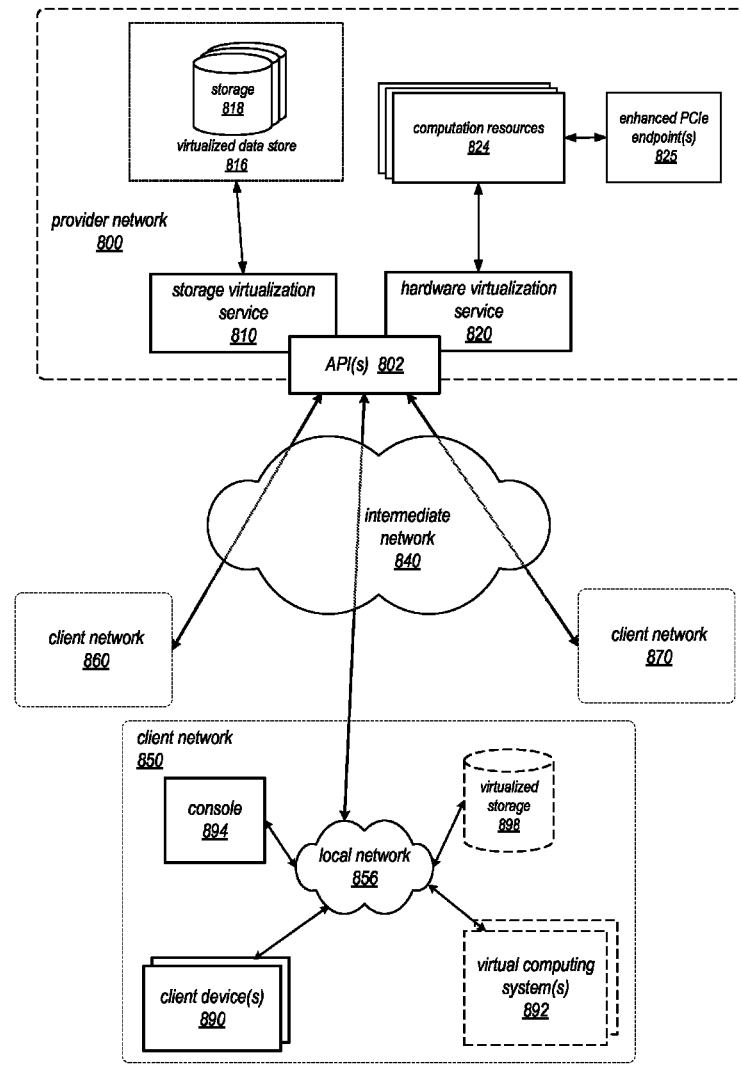
FIG. 8 is a block diagram illustrating an example provider network environment in which the apparatus and techniques described herein are used to accelerate multi-device emulation, according to at least some embodiments.

FIG. 8 is a block diagram illustrating an example provider network environment in which the techniques described herein for using an enhanced PCIe endpoint to accelerate the emulation of PCIe compliant hardware devices may be employed, according to at least some embodiments. In this example, the provider network environment 800 provides a storage virtualization service and a hardware virtualization service to clients. In this example, hardware virtualization service 820 provides multiple computation resources 824 (e.g., host processors executing one or more VMs) to clients. The computation resources 824 may, for example, be rented or leased to clients of the provider network 800 (e.g., to a client that implements client network 850, client network 860, and/or client network 870) in order to implement various applications. Each computation resource 824 may be provided with one or more private IP addresses. Provider network 800 may be configured to route packets from the private IP addresses of the computation resources 824 to public Internet destinations, and from public Internet sources to the computation resources 824. As illustrated in this example, in some embodiments, the service provider network may also include one or more enhanced PCIe endpoints 825 (which may be similar to any of the enhanced PCIe endpoints 320 illustrated in FIG. 3A, 3B, or 3C), e.g., one or more PCIe cards that are configured to emulate physical and/or virtual functions of PCIe compliant devices for the benefit of service subscribers.

Provider network 800 may provide a client network (e.g., client network 850, 860, or 870 coupled to intermediate network 840 via local network 856) the ability to implement virtual computing systems 892 via hardware virtualization service 820 coupled to intermediate network 840 and to provider network 800. Note that, in some embodiments, the virtual computing systems 892 implemented on behalf of service subscribers may include virtual PCIe compliant devices, which are emulated on the enhanced PCIe endpoint card(s) 825. Note also that in some embodiments, each of client networks 860 and 870 may include elements that are similar to corresponding elements of client network 850 (not shown) and may provide functionality similar to that of client network 850, while in other embodiments, client network 860 and/or 870 may include more, fewer, or different elements than those illustrated in FIG. 8 as being part of client network 850 and/or may provide functionality that is different from that of client network 850. In some embodiments, hardware virtualization service 820 may provide one or more APIs 802, for example a web services interface, via which a client network 850, 860, or 870 may access functionality provided by the hardware virtualization service 820 via a console such as console 894. In at least some embodiments, at the provider network 800, each virtual computing system at a client network (e.g., a virtual computing system 892 at client network 850) may correspond to computation resources 824 and/or enhanced PCIe endpoints 825 that are leased, rented, or otherwise provided to the client network.

In this example, from an instance of a virtual computing system 892 and/or another client device 890 or console 894 of a client network 850, 860, or 870, a client may access the functionality of storage virtualization service 810, for example via one or more APIs 802, to access data from and store data to a virtual data store 816 provided by the provider network 800. In some embodiments, a virtualized data store gateway (not shown) may be provided at the client network (e.g., at client network 850, 860, or 870) that may locally cache at least some data, for example frequently accessed or critical data, and that may communicate with storage virtualization service 810 via one or more communications channels to upload new or modified data from a local cache so that the primary store of data (virtualized data store 816) is maintained. In at least some embodiments, a user, via a virtual computing system 892 and/or on another client device 890, may mount and access one or more storage volumes 818 of virtual data store 816, each of which appears to the user as local virtualized storage 898.

Figure 9:
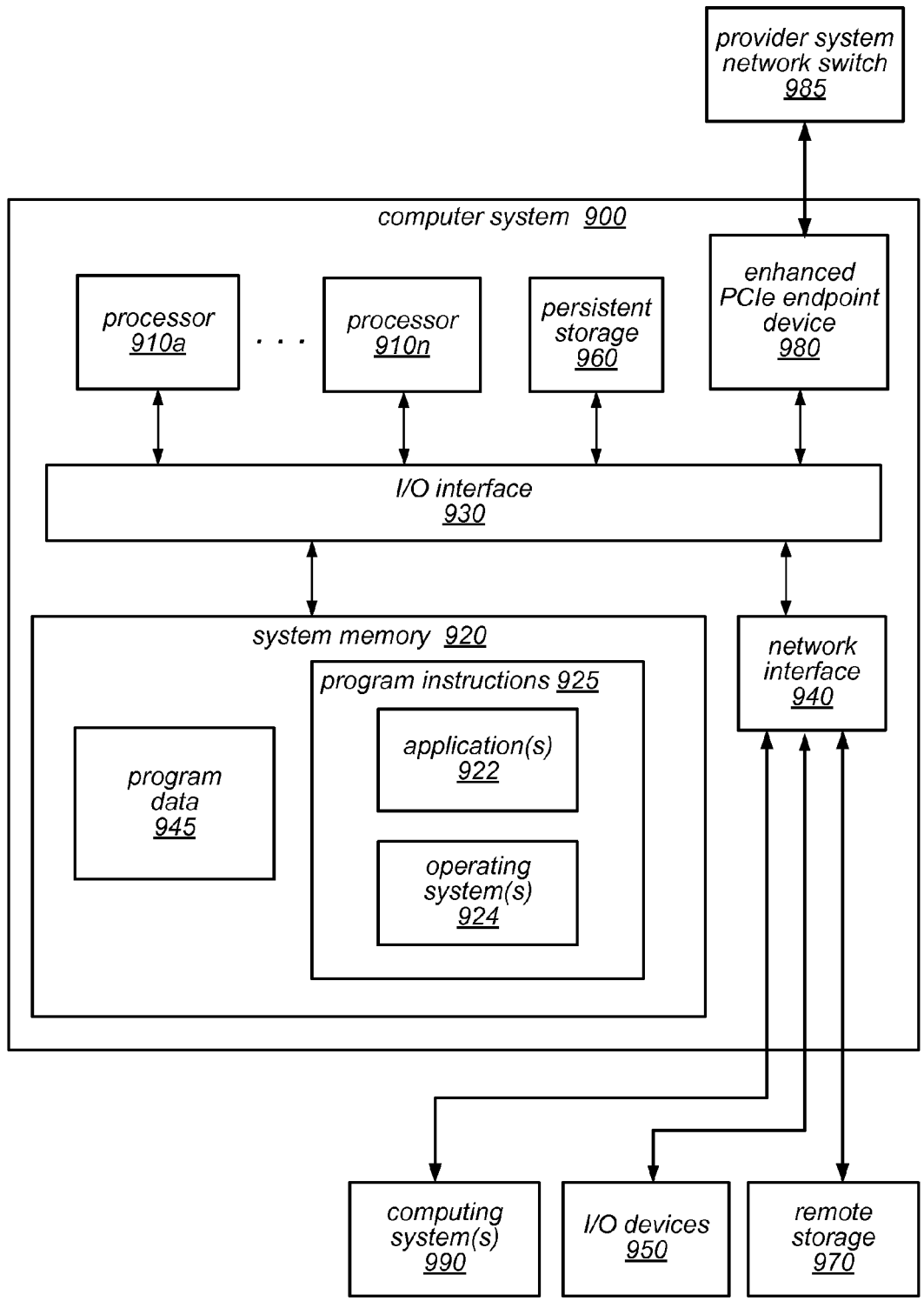
FIG. 9 is a block diagram illustrating a computer system configured to implement the techniques described herein, according to various embodiments.

The methods described herein may in various embodiments be implemented by any combination of hardware and/or software. For example, in one embodiment, the methods may be implemented by one or more computer systems, each of which includes a processor executing program instructions stored on a computer-readable storage medium coupled to the processor. The program instructions may be configured to implement at least some of the functionality described herein for using an enhanced PCIe endpoint to accelerate the emulation of PCIe compliant hardware devices. FIG. 9 is a block diagram illustrating a computer system configured to implement at least a portion of the techniques described herein, according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. Note that computer system 900 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein. In some embodiments, computer system 900 may be an enhanced PCIe endpoint device on which any number of PCIe compliant hardware devices are emulated on behalf of virtualized computing service clients.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose, special-purpose, or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement a distributed system. In another example, an instance of a server application executing on computer system 900 may use network interface 940 to communicate with a client application and/or with other instances of the server application that may be implemented on other computer systems.

In the illustrated embodiment, computer system 900 also includes one or more persistent storage devices 960. In various embodiments, persistent storage devices 960 may correspond to disk drives, tape drives, solid state memory, other mass storage devices, or any other persistent storage device. Computer system 900 (or an application, software component, or operating system operating thereon) may store instructions and/or data in persistent storage devices 960, as desired, and may retrieve the stored instruction and/or data as needed. Computer system 900 also includes enhanced PCIe endpoint device 980, which may be similar to any of the enhanced PCIe endpoints 320 in FIG. 3A, 3B, or 3C. For example, enhanced PCIe endpoint device 980 may include an endpoint SOC (such as endpoint SOC 380 in FIG. 3A, endpoint SOC 382 in FIG. 3B or endpoint SOC 384 in FIG. 3C), which includes a network interface, a PCIe endpoint controller, an emulation processor, host interface circuitry (such as any of the host interface modules 360 illustrated in FIG. 3A, 3B, or 3C), a PCIe endpoint controller, a request processor, host interface steering logic, a response processor, multiple transaction ring buffer CSRs and transaction ring buffer pointers, endpoint memory (such as endpoint memory 370 in FIG. 3A, 3B, or 3C), which may store emulation code and/or include (instantiated within memory 370) multiple transaction ring buffers, SOC memory (such as SOC memory 377 in FIG. 3B), which may include (instantiated within SOC memory 377) multiple transaction ring buffers, and/or any other circuitry suitable to support using an enhanced PCIe endpoint to accelerate the emulation of PCIe compliant hardware devices, as described herein.

As illustrated in FIG. 9, a network interface of enhanced PCIe endpoint device 980 may communicate with other networks and/or networked devices through provider system network switch 985. For example, in some embodiments, provider system network switch 985 may serve to connect the enhanced PCIe endpoint device 980 (or a network interface thereof) to other networks (e.g., to the public Internet or to an intermediate network) and/or to other networked devices in a provider's data center (e.g., to the next level data center routers that, eventually, connect together all of the other servers, or racks thereof, in the data center).

Computer system 900 includes one or more system memories 920 that are configured to store instructions and data accessible by processor 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement at least a portion of the methods and techniques described herein for using an enhanced PCIe endpoint to accelerate the emulation of PCIe compliant hardware devices. In various embodiments, program instructions 925 (and/or program instructions within any emulation code stored in memory on enhanced PCIe endpoint device 980) may be encoded in platform native binary, any interpreted language such as Java™ byte-code, or in any other language such as C/C++, Java™, etc., or in any combination thereof. For example, in the illustrated embodiment, program instructions 925 include program instructions executable to implement one or more application(s) 922 (which may include various configuration modules, not shown), and/or operating system(s) 924, which may include or be implemented as a hypervisor or virtual machine monitor, or any of various operating systems, such as UNIX, LINUX, Solaris™, MacOS™, Windows™, etc.

Note that in various embodiments, some or all of system memory 910 (including some or all of program instructions 925, and/or program data 945) may be implemented within shared physical memory pages in a stand-alone computing system or in a system that provides virtualized resources to clients, as described herein.

Any or all of program instructions 925, including application(s) 922, configuration module(s), emulation code stored in memory on enhanced PCIe endpoint device 980, and/or operating system(s) 924, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include storage for program data 945. In various embodiments, system memory 920 (e.g., program data 945 within system memory 920) and/or remote storage 970 may store various configuration parameter values or other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In various embodiments, I/O interface 930 may include support for devices attached through one or more types of peripheral buses, such as a variant of the Peripheral Component Interconnect (PCI) bus standard, the Peripheral Component Interconnect Express (PCIe) bus standard, or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990 (which may implement one or more server nodes and/or clients of a distributed system, such as a host server or host processor thereof), for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. An apparatus, comprising:
a processor;
a memory, comprising:
program instructions that when executed on the processor emulate one or more hardware devices that are compliant with the Peripheral Component Interconnect Express (PCIe) standard; and
one or more ring buffers, each configured to store information from a plurality of transaction layer packets that comprise transactions directed to the one or more emulated hardware devices; and
packet steering circuitry;
wherein, in response to receipt of a transaction layer packet comprising a transaction that is directed to one of the one or more emulated hardware devices, the packet steering circuitry is configured to steer information from the transaction layer packet to a particular one of the one or more ring buffers dependent, at least in part, on a routing identifier or address associated with a targeted function of the one of the one or more emulated hardware devices; and
wherein, subsequent to the transaction layer packet information being steered to the particular one of the one or more ring buffers, the processor is configured to retrieve the transaction layer packet information and process the transaction included in the transaction layer packet information, wherein to process the transaction, the processor is configured to execute a portion of the program instructions that when executed cause the processor to emulate the one of the one or more emulated hardware devices to which the transaction is directed.

2. The apparatus of claim 1, wherein the particular one of the one or more ring buffers to which the transaction layer packet information is steered is further dependent on a traffic class that is specified in the transaction layer packet.

3. The apparatus of claim 1,
wherein the apparatus further comprises transaction response circuitry;
wherein the transaction included in the transaction layer packet information is a non-posted request type transaction;
wherein subsequent to processing the transaction, the processor is configured to execute a portion of the program instructions that when executed on the processor cause the processor to write an indication that the transaction has been processed; and
wherein in response to the processor writing an indication that the transaction has been processed, the transaction response circuitry is configured to generate a completion response packet to be returned to a requester from which the transaction layer packet was received.

4. The apparatus of claim 1,
wherein the apparatus further comprises transaction response circuitry;
wherein, in response to receipt of a second transaction layer packet comprising a second transaction that is a posted request type transaction:
  the packet steering circuitry is configured to steer information from the second transaction layer packet to a particular one of the one or more ring buffers as a notification; and
  the transaction response circuitry is configured to complete the second transaction without generating a completion response packet for the second transaction.

5. The apparatus of claim 1,
wherein the apparatus further comprises transaction response circuitry;
wherein, in response to receipt of a second transaction layer packet comprising a second transaction that is a configuration request transaction, the transaction response circuitry is configured to:
  complete the configuration request without intervention by the processor; and
  generate a completion response packet for the second transaction to be returned to a requester from which the second transaction layer packet was received.

6. A system, comprising:
a host processor; and
an enhanced Peripheral Component Interconnect Express (PCIe) endpoint device;
wherein the enhanced PCIe endpoint device comprises:
  an endpoint emulation processor;
  a memory, comprising:
    program instructions that when executed on the endpoint emulation processor emulate one or more hardware devices that are compliant with a PCIe standard; and
    one or more ring buffers, each configured to store information from a plurality of transaction layer packets that comprise transactions directed to the one or more emulated hardware devices; and
  host interface circuitry, comprising:
    packet steering circuitry; and
    a respective pointer register for each of the ring buffers;
wherein, to perform a transaction directed to one of the one or more emulated hardware devices, the host processor is configured to send a transaction layer packet to the enhanced PCIe endpoint device;
wherein, in response to receipt of the transaction layer packet by the enhanced PCIe endpoint device, the packet steering circuitry is configured to push the transaction to a particular one of the one or more ring buffers at an address indicated by its respective pointer register dependent, at least in part, on a routing identifier or address associated with a targeted function of the one of the one or more emulated hardware devices; and
wherein, subsequent to the transaction being pushed to the particular one of the one or more ring buffers, the endpoint emulation processor is configured to:
  retrieve the transaction from the particular one of the one or more ring buffers;
  process the transaction, wherein to process the transaction, the endpoint emulation processor is configured to execute a portion of the program instructions to emulate the one of the one or more emulated hardware devices to which the transaction is directed; and
  complete the transaction.

7. The system of claim 6,
wherein the endpoint emulation processor is a multi-core processor;
wherein to process the transaction, one processor core of the endpoint emulation processor is configured to retrieve the transaction from the particular one of the one or more ring buffers and process the transaction; and
wherein, while the transaction is being processed by the one processor core of the endpoint emulation processor, another processor core of the endpoint emulation processor is configured to retrieve another transaction that was received by the enhanced PCIe endpoint device from the particular one of the one or more ring buffers or from another one of the one or more ring buffers and process the other transaction.

8. The system of claim 6,
wherein the transaction comprises a configuration request; and
wherein to complete the transaction, the host interface circuitry is configured to:
  complete the configuration request without intervention by the endpoint emulation processor; and
  generate a completion response packet for the transaction to be returned to a requester from which the transaction layer packet was received.

9. The system of claim 6,
wherein the transaction comprises a non-posted request; and
wherein to process the transaction, the endpoint emulation processor is configured to execute a portion of the program instructions that when executed on the endpoint emulation processor cause the endpoint emulation processor to write an indication that the transaction has been processed; and
wherein to complete the transaction, in response to the endpoint emulation processor writing an indication that the transaction has been processed, the host interface circuitry is configured to generate a completion response packet to be returned to the host processor.

10. The system of claim 6,
wherein a second transaction comprises a posted request; and
wherein to complete the second transaction, the host interface circuitry is configured to complete the second transaction without generating a completion response packet for the transaction.

11. The system of claim 6, wherein the one or more emulated hardware devices comprise two or more emulated hardware devices that are compliant with the PCIe standard.

12. The system of claim 6,
wherein the one or more emulated hardware devices comprise two or more sets of emulated hardware devices that are compliant with the PCIe standard;
wherein the enhanced PCIe endpoint device further comprises a switch configured for selection of one of the two or more sets of emulated hardware devices; and
wherein to process the transaction, the enhanced PCIe endpoint device is configured to set the switch to enable selection of the one of the two or more sets of emulated hardware devices comprising the one of the one or more emulated hardware devices to which the transaction is directed.

13. The system of claim 6, wherein the enhanced PCIe endpoint device is configured to:
- receive, from the host processor, a plurality of transaction layer packets comprising transactions that are directed to one of the one or more emulated hardware devices; and
- process the plurality of received transaction layer packets in an order that is different than the order in which they were received while maintaining information indicative of the order in which they were received.

14. The system of claim 13,
- wherein the host interface circuitry is configured to return respective completion response packets to the host processor for at least some of the plurality of received transaction layer packets; and
- wherein for the at least some of the plurality of received transaction layer packets, the host interface circuitry is configured to return the respective completion response packets to the host processor in compliance with transaction ordering rules of the PCIe standard.

15. A method, comprising:
- storing program instructions in a memory of an endpoint device that when executed by one or more processor cores on the endpoint device emulate a Peripheral Component Interconnect Express (PCIe) compliant hardware device;
- configuring packet steering circuitry on the endpoint device to implement a mapping of transaction parameter values to respective ones of a plurality of transaction ring buffers on the endpoint device, wherein the transaction parameter values comprise one or more of: a routing identifier value or address that is associated with a targeted physical function, a routing identifier value or address that is associated with a targeted virtual function, a routing identifier value or address that is associated with a targeted emulated hardware device, or a traffic class that is specified in a received transaction layer packet;
- receiving, by host interface circuitry of the endpoint device, a transaction layer packet comprising a transaction directed to the emulated hardware device;
- processing the transaction, wherein said processing comprises:
  - executing, by at least one of the one or more processor cores, the program instructions that emulate the PCIe compliant hardware device; and
  - steering, by the packet steering circuitry, the transaction to a particular one of the transaction ring buffers, dependent on the mapping; and
- subsequent to said processing and in response to receipt of a reconfiguration request by the host interface circuitry of the endpoint device, replacing at least a portion of the program instructions in the memory with alternate program instructions that when executed by the one or more processor cores emulate a different PCIe compliant hardware device.

16. The method of claim 15, wherein the method further comprises initializing a respective pointer register in the host interface circuitry of the endpoint device for each of the plurality of transaction ring buffers, wherein said initializing comprises writing an address to each of the pointer registers.

17. The method of claim 16, wherein the method further comprises initializing a respective control and status register in the host interface circuitry of the endpoint device for each of the plurality of transaction ring buffers, wherein said initializing comprises setting configuration parameter values in each of the control and status registers to indicate what types of transactions are to be pushed into the transaction ring buffer.

18. The method of claim 17,
- wherein for each of the plurality of transaction ring buffers, the respective control and status register comprises at least one of a head pointer or a tail pointer usable in managing the transaction ring buffer; and
- wherein said processing further comprises the host interface circuitry updating the tail pointer or the head pointer for the particular one of the transaction ring buffers.

* * * * *